United States Patent [19]

Kaplan

[11] Patent Number: 5,664,419
[45] Date of Patent: Sep. 9, 1997

[54] METHOD OF AND APPARATUS FOR PRODUCING POWER USING GEOTHERMAL FLUID

[75] Inventor: Uri Kaplan, Moshav Galia, Israel

[73] Assignee: Ormat Industries Ltd, Yavne, Israel

[21] Appl. No.: 248,550

[22] Filed: May 24, 1994

Related U.S. Application Data

[63] Continuation of Ser. No. 966,465, Oct. 26, 1992, abandoned.

[51] Int. Cl.$^6$ ............................................. F03G 4/00
[52] U.S. Cl. ........................ 60/641.2; 60/641.5; 60/691
[58] Field of Search ............................. 60/641.2, 641.3, 60/641.5, 649, 691

[56] References Cited

U.S. PATENT DOCUMENTS

| | | | |
|---|---|---|---|
| 3,040,528 | 6/1962 | Tabor et al. | 60/651 |
| 3,802,185 | 4/1974 | Tullock | 60/649 |
| 4,132,075 | 1/1979 | Fleck et al. | 60/641.5 |
| 5,038,567 | 8/1991 | Mortiz | 60/641.5 |

*Primary Examiner*—Ira S. Lazarus
*Assistant Examiner*—Sara Sachie Raab
*Attorney, Agent, or Firm*—Donald M. Sandler

[57] ABSTRACT

Power is produced using a two-phase geothermal fluid, utilizing a separator for separating the geothermal fluid into a steam branch and a brine branch. A vaporizer, containing an organic fluid, is responsive to the steam in the steam branch for producing vaporized organic fluid and cooled steam. A preheater receives the brine in the brine branch and steam condensate from the vaporizer for transferring sensible heat to the organic fluid before the brine and steam condensate are disposed of. An organic vapor turbine is responsive to the vaporized organic fluid produced by the vaporizer for generating electricity and producing organic vapor that exits the turbine. A recuperator is provided for receiving the organic vapor that exits the turbine and heating liquid organic fluid, thereby producing heat depleted organic fluid. A condenser is responsive to the heat depleted organic fluid for condensing the same into liquid organic fluid. Finally, a pump is provided for pumping liquid organic fluid in the condenser back into the vaporizer through the recuperator and the preheater.

3 Claims, 1 Drawing Sheet

METHOD OF AND APPARATUS FOR PRODUCING POWER USING GEOTHERMAL FLUID

This application is a continuation, of application Ser. No. 07/966,465, filed Oct. 26, 1992, now abandoned.

TECHNICAL FIELD

This invention relates to a method of and apparatus for producing power using a two-phase geothermal fluid.

BACKGROUND OF THE INVENTION

Each of co-pending U.S. patent application Ser. No. 658,303, filed Feb. 20, 1991, and U.S. Pat. No. 5, 038,567 discloses a geothermal power plant for use with a two-phase geothermal fluid source that produces a mixture of saturated steam and brine, the working fluid for the power plant being an organic fluid. In such a plant, a separator divides the geothermal fluid into a branch containing steam, and a branch containing brine. The steam is applied to a vaporizer containing an organic fluid that is vaporized by the steam which is cooled as a result, producing steam condensate. As explained in the '303 application, and in the '567 patent, the disclosures of which are hereby incorporated by reference, the cooled steam can be combined with the brine produced by its separator and applied to a preheater which serves to preheat the liquid organic fluid supplied to the vaporizer.

The organic vapor produced by the vaporizer is applied to a turbogenerator wherein the vapor expands producing electricity and heat depleted vaporized organic fluid. A condenser condenses the vaporized organic fluid producing condensate that is pumped back into the vaporizer through the preheater.

Typically, the minimum exit temperature of the brine from the preheater is limited by the minerals, chiefly silica, in the brine. This limits the amount of sensible heat that can be transferred from the brine to the liquid organic fluid in the preheater in order to prevent precipitation of the minerals in the brine. As a result, the exit temperature of the brine limits the power that the turbogenerator can produce. Furthermore, the amount of heat available in the steam usually exceeds the amount of heat needed to vaporize the organic fluid with the result that a significant amount of heat available in the geothermal fluid is not utilized. This is particularly true when organic fluids are used in sub-critical power cycles.

It is therefore an object of the present invention to provide a new and improved method of and apparatus for producing power using a two-phase geothermal fluid wherein the power output is increased without reducing either the exit temperature of the brine from the preheater, or the vaporizing temperature of the organic working fluid, even though the amount of heat utilized by the organic fluid is increased.

BRIEF DESCRIPTION OF THE INVENTION

According to the present invention, power is produced using a two-phase geothermal fluid, utilizing a separator for separating the geothermal fluid into a steam branch and a brine or liquid branch. A vaporizer, containing an organic fluid, is responsive to the steam in the steam branch for producing vaporized organic fluid and condensed geothermal steam, or steam condensate. A preheater receives the brine in the brine branch and steam condensate from the vaporizer for transferring sensible heat to the organic fluid before the brine and steam condensate are disposed of. An organic vapor turbine is responsive to the vaporized organic fluid produced by the vaporizer for producing work, preferably by generating electricity, with organic vapor being exhausted from the turbine after such work has been produced. A recuperator is provided for receiving organic vapor exhausted from the turbine and heating liquid organic fluid, thereby producing heat depleted organic fluid. A condenser is responsive to the heat depleted organic fluid for condensing the same into liquid organic fluid. Finally, a pump is provided for pumping liquid organic fluid in the condenser back into the vaporizer through the recuperator and the preheater.

The presence of the recuperator permits additional heat to be used by the organic working fluid in excess of that transferred directly by the geothermal fluid in the vaporizer and the preheater, without increasing the vaporization temperature of the organic fluid. Thus, the exit temperature of the brine leaving the preheater is no longer the controlling factor for establishing the amount of heat that can be added to the working fluid. Consequently, the present invention provides for a power plant capable of generating more power from the same amount of heat transferred from the geothermal fluid since, in accordance with the present invention, the vaporizing temperature of the organic working fluid can be maintained even though the amount of heat added to the organic fluid is increased

BRIEF DESCRIPTION OF THE DRAWINGS

An embodiment of the present invention is described by way of example with reference to the accompanying drawings wherein.

DETAILED DESCRIPTION

Figure 1:
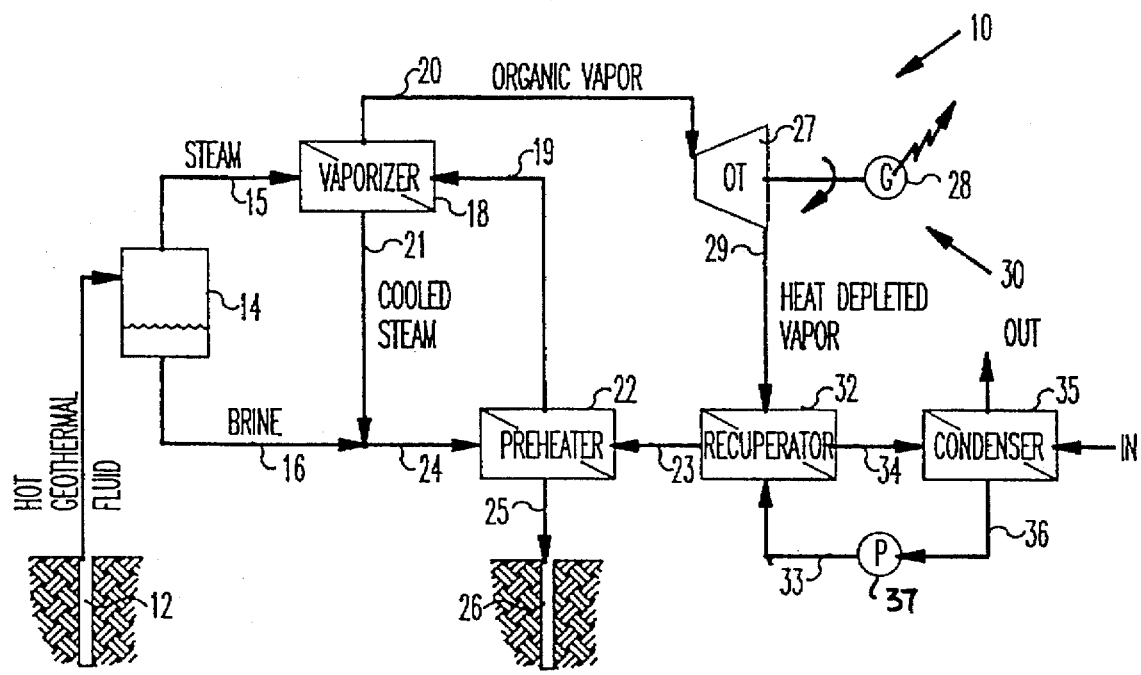
FIG. 1 is a block diagram of the present invention showing the use of a recuperator for the purpose of increasing the thermal efficiency of a geothermal power plant.

Referring now to the drawings, reference numeral 10 in FIG. 1 designates a power plant according to the present invention for producing power utilizing a two-phase geothermal fluid. Production well 12 produces hot geothermal fluid comprising saturated steam and hot liquid brine which is applied to separator 14 that divides the applied geothermal fluid into two branches 15 and 16. Branch 15 contains saturated steam and branch 16 contains hot brine or geothermal fluid. Vaporizer 18, which receives liquid organic fluid by way of conduit 19, receives steam from steam branch 15 and produces vaporized organic fluid in output line 20 and steam condensate in output line 21. Essentially, the geothermal steam gives up its latent heat to the liquid working fluid in vaporizer 18 so that the fluid contained in line 21 is condensed geothermal steam, or steam condensate, at essentially the same temperature as the brine in branch 16.

Preheater 22 receives liquid organic working fluid in line 23 and preferably, a combination of brine in branch 16 and condensate in line 21, which are combined in line 24 and applied to the preheater. Alternatively, particularly when a high amount of non-condensable gases are present in the geothermal fluid, steam condensate can be injected into well 26 without being added to the brine entering preheater 22. This is because the temperature of the condensate will be cooler than the brine entering preheater 22. In a further alternative, in such a case, if preferred, the cooler steam condensate can be added to the brine at a suitable point within preheater 22 where the condensate temperature matches the brine temperature in the preheater.

Sensible heat in the fluid in line 24 to the preheater is transferred as sensible heat to the liquid working fluid in the preheater which produces preheated liquid working fluid in line 19 and cooled brine in line 25. The cooled brine is transported to injection well 26 and is disposed of therein.

Turbogenerator 30 includes organic vapor turbine 27 which receives vaporized organic vapor from line 20 produced by vaporizer 18 and drives generator 28 as the vaporized working fluid expands in the turbine. The turbine exhausts organic vapor, after work has been produced, into exhaust line 29 which is connected to recuperator 32, where some of the heat in this vapor is transferred to liquid organic fluid entering the recuperator through line 33. As is well known, the shape of the temperature-entropy (T-S) diagram for organic fluids suitable for use in Rankine cycle power plants (e.g., pentane, and isopentane) is tilted to the right so that expansion of vaporized organic fluid from the saturated vapor line on the T-S diagram, in a turbine, takes place in the superheat region of the diagram. As a result, the vapor exhausted from the turbine contains a significant amount of superheat that must be removed by the condenser, and consequently wasted. In the present invention, however, much of the superheat is recovered in the recuperator.

The resulting heat depleted organic vapor exits the recuperator through line 34, and enters condenser 35 where condensation to working liquid fluid occurs, the liquid working fluid exiting the condenser in line 36. Pump 37 pumps liquid organic fluid from line 36 into vaporizer 18 through recuperator 32 and preheater 22.

Condenser 35 is shown as a generic condenser in the sense that coolant flows in and out of the condenser for the purpose of condensing the vapor passed to the condenser by recuperator 32. Specifically, condenser 35 may be an air cooled condenser, in which case ambient air would be the coolant, or the condenser could be a water cooled condenser in which case a cooling tower for the water may be involved.

Figure 2:
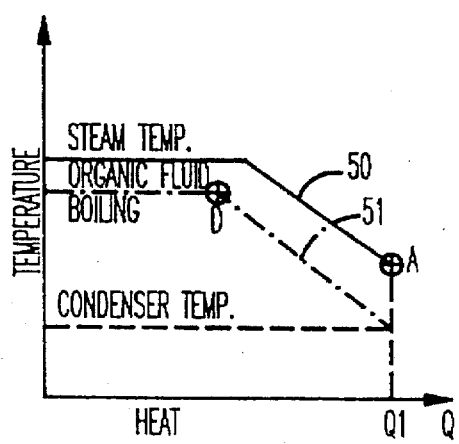
FIG. 2 is a temperature/heat diagram for a prior art power plant based upon the arrangement of FIG. 1 without a recuperator.

As discussed above, in the conventional two-phase geothermal power plant, that is, a power plant without a recuperator, the temperature/heat diagram usually would be as indicated in FIG. 2. Curve 50 in FIG. 2 represents the temperature variation in the geothermal fluid as it enters the vaporizer and leaves the preheater at point "A" before the fluid is applied to injection well 26. Curve 51, on the other hand, represents the temperature variation of the organic fluid in the cycle.

As can be seen in FIG. 2, the organic fluid is heated to point "D", and is then vaporized in vaporizer 18 at a constant temperature somewhat below the steam temperature. The inclined portion of curve 51 starting from the condenser temperature and rising to point "D", the boiling temperature of the organic fluid, represents the sensible temperature rise of the organic fluid as the fluid passes from the condenser through the preheater and into a vaporizer. $Q_1$ represents the amount of heat input to the organic fluid. This heat is established by reason of a limitation on the temperature of the brine that exits the preheater. Any lower temperature than that indicated will result in the precipitation of minerals, particularly silica, in the brine in the preheater.

Figure 3:
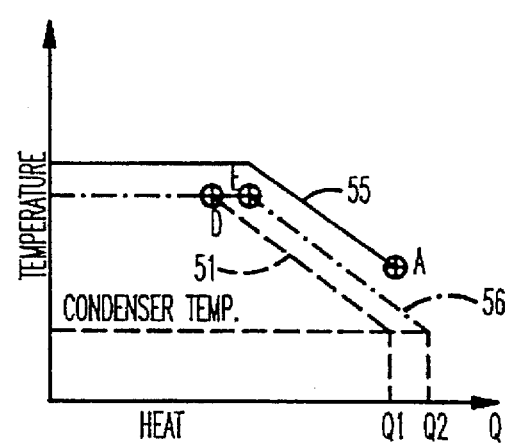
FIG. 3 is a preferred temperature/heat diagram for the power plant shown in FIG. 1.

In order to increase heat input to the organic fluid without affecting the temperature at the outlet of the preheater, recuperator 32 is utilized. FIG. 3 shows the preferred relationship between the variation in temperature of the geothermal fluid in comparison to the variation of temperature of the organic fluid. In FIG. 3, curve 55 represents the variation in the temperature of the geothermal fluid, while curve 56 represents the variation in temperature of the organic working fluid. Superimposed on FIG. 3 is curve 51 shown in FIG. 2 for the purpose of illustrating how the heat input to the organic working is increased by reason of recuperator 32. As indicated, the amount of heat is increased from $Q_1$ to $Q_2$ with the result that the generated power output of the power plant shown in FIG. 1 is increased by the ratio of $Q_2$ to $Q_1$ without decreasing the thermal efficiency due to the drop in the vaporizing temperature of the organic working fluid. While FIG. 3 shows point E positioned vertically below the break point of curve 55, which is usually the preferred case, the present invention, by reason of the provision of recuperator 32, includes all cases where point D is caused to move to the right, e.g., the case shown as point E in FIG. 3. In some cases, it may be preferred to have the break point in curve 56 (point E) even to the right of the break point of curve 55.

The advantages and improved results furnished by the method and apparatus of the present invention are apparent form the foregoing description of the preferred embodiment of the invention. Various changes and modifications may be made without departing from the spirit and scope of the invention as described in the appended claims.

What is claimed:

1. Apparatus for producing power using geothermal fluid comprising:

a) a separator for separating said geothermal fluid into geothermal steam and geothermal brine;

b) a vaporizer containing an organic fluid and responsive to said geothermal steam for vaporizing said organic fluid at constant temperature and pressure thereby producing vaporized organic fluid and geothermal steam condensate;

c) an organic vapor turbine responsive to said vaporized organic fluid for expanding the same and producing electricity, and from which organic vapor exits;

d) a condenser responsive to said organic vapor exiting the turbine for condensing the same into organic fluid condensate;

e) means for supplying said organic fluid condensate to said vaporizer;

f) heating means for heating said organic fluid condensate, before it reaches said vaporizer, with heat contained in said organic vapor exiting the turbine and in said geothermal steam condensate, said heating means including a preheater for transferring heat from said geothermal brine and said geothermal steam condensate to said organic fluid condensate thereby heating the same to about said vaporization temperature, and a recuperator for receiving said organic fluid condensate from said condenser, and for receiving said organic vapor that exits from said turbine thereby transferring heat from the vapor that exits the turbine to said organic fluid condensate before said organic fluid condensate reaches said preheater; and g) said heating means being constructed and arranged so that substantially only latent heat in said geothermal steam is transferred to the organic fluid in the vaporizer as heat of vaporization of the organic fluid, and substantially only sensible heat in said geothermal brine and said geothermal steam condensate is transferred to the organic fluid condensate in said preheater in a liquid-to-liquid heat transfer.

2. Apparatus for producing power using geothermal fluid comprising:
   a) a separator for separating said geothermal fluid into a steam branch and a brine branch;
   b) a vaporizer containing an organic fluid and responsive to steam in the steam branch for producing vaporized organic fluid at a given vaporization temperature, and for producing geothermal steam condensate;
   c) a preheater containing an organic fluid and receiving said brine and said cooled geothermal steam for heating said organic fluid to a temperature below its vaporization temperature;
   d) an organic vapor turbine responsive to the vaporized organic fluid produced by said vaporizer for generating electricity and producing heat depleted organic vapor that exits from the turbine;
   e) a recuperator responsive to said organic vapor that exits from the turbine for heating organic fluid and producing cooled heat depleted organic vapor;
   f) a condenser responsive to said cooled heat depleted organic vapor for condensing the same into organic fluid condensate;
   g) a pump for pumping said organic fluid condensate in said condenser into said vaporizer, first through said recuperator, and then through said preheater; and
   h) said preheater and said recuperator being constructed and arranged so that substantially all of the organic fluid condensate pumped into said vaporizer is in a liquid state at said vaporization temperature when such fluid enters the vaporizer, and substantially all of the cooled geothermal steam produced by the vaporizer is in a liquid state whereby substantially only latent heat in said geothermal steam is transferred to the organic fluid in the vaporizer as heat of vaporization of the organic fluid, and substantially only sensible heat in said geothermal brine and geothermal steam condensate is transferred to the organic fluid condensate in said preheater.

3. A method for producing power using geothermal fluid comprising:
   a) separating said geothermal fluid into geothermal brine and geothermal steam;
   b) supplying preheated organic fluid to a vaporizer that vaporizes the organic fluid into organic vapor using heat contained in said geothermal steam and producing cooled geothermal steam;
   c) expanding said organic vapor for producing electricity and heat depleted organic vapor;
   d) heating organic fluid in a recuperator with heat contained in said heat depleted organic vapor for producing cooled heat depleted organic vapor and heated organic fluid;
   e) condensing said cooled heat depleted organic vapor in a condenser for producing organic condensate;
   f) supplying said organic condensate produced by said condenser to a recuperator;
   g) heating said heated organic liquid in a preheater with heat contained in said geothermal brine and said cooled geothermal steam for producing said preheated organic fluid which is supplied to said vaporizer; and
   h) operating said recuperator and preheater such that substantially all of the organic fluid condensate pumped into said vaporizer is in a liquid state at said vaporization temperature when such fluid enters the vaporizer, and substantially all of the geothermal steam condensate produced by the vaporizer is in a liquid state whereby substantially only latent heat in said geothermal steam is transferred to the organic fluid in the vaporizer as heat of vaporization of the organic fluid, and substantially only sensible heat in said geothermal brine and geothermal steam condensate is transferred to the organic fluid condensate in said preheater.

* * * * *